(12) United States Patent
Nakayama

(10) Patent No.: US 6,473,530 B2
(45) Date of Patent: *Oct. 29, 2002

(54) ENCODING AND DECODING APPARATUSES AND IMAGE PROCESSING APPARATUS USING THE SAME

(75) Inventor: Tadayoshi Nakayama, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,631

(22) Filed: Dec. 22, 1998

(65) Prior Publication Data

US 2002/0090137 A1 Jul. 11, 2002

(30) Foreign Application Priority Data

Dec. 24, 1997 (JP) .............................. 9-355656

(51) Int. Cl.⁷ ................................... G06K 9/36
(52) U.S. Cl. ..................................... 382/238
(58) Field of Search ............................. 382/232, 236, 382/238, 240, 242, 248, 250; 358/432, 433; 348/384, 394–395, 400–404, 407–416, 420–421, 425, 430, 431, 695

(56) References Cited

U.S. PATENT DOCUMENTS

| | | | | |
|---|---|---|---|---|
| 5,748,786 A | * | 5/1998 | Zandi et al. | 382/240 |
| 5,867,602 A | * | 2/1999 | Zandi et al. | 382/248 |
| 5,881,176 A | * | 3/1999 | Keith et al. | 382/248 |
| 5,966,465 A | * | 10/1999 | Keith et al. | 382/232 |
| 6,044,172 A | * | 3/2000 | Allen | 382/166 |
| 6,141,446 A | * | 10/2000 | Bolick et al. | 382/233 |
| 6,195,465 B1 | * | 2/2001 | Zandi et al. | 382/248 |

* cited by examiner

Primary Examiner—Jose L. Couso
(74) Attorney, Agent, or Firm—Fitzpatrick, Cella, Harper & Scinto

(57) ABSTRACT

This invention is to provide encoding and decoding apparatuses capable of increasing the processing speed even when a learning RAM need be frequently cleared for encoding or decoding in units of bands, and an image processing apparatus using the same. The encoding or decoding apparatus includes a plurality of learning RAMs (502, 602) for storing learned contents, and switches (521, 523, 525, 621, 623, 725, 630) for setting one of the plurality of learning RAMs in a learning state and the other in the initialized state and switching the state for every band processing. The apparatus also includes a learning RAM (502) for storing learned contents, a band sequence storage memory (702) for dividing encoding into a plurality of sequences in units of bands and storing data corresponding to a current sequence, and a matching detection circuit (704) and AND gate (706) for, when the sequence stored in the band sequence storage memory is different from the sequence of encoding which is progressing, inhibiting the learned contents read out from the learning RAM from being used for encoding.

10 Claims, 15 Drawing Sheets

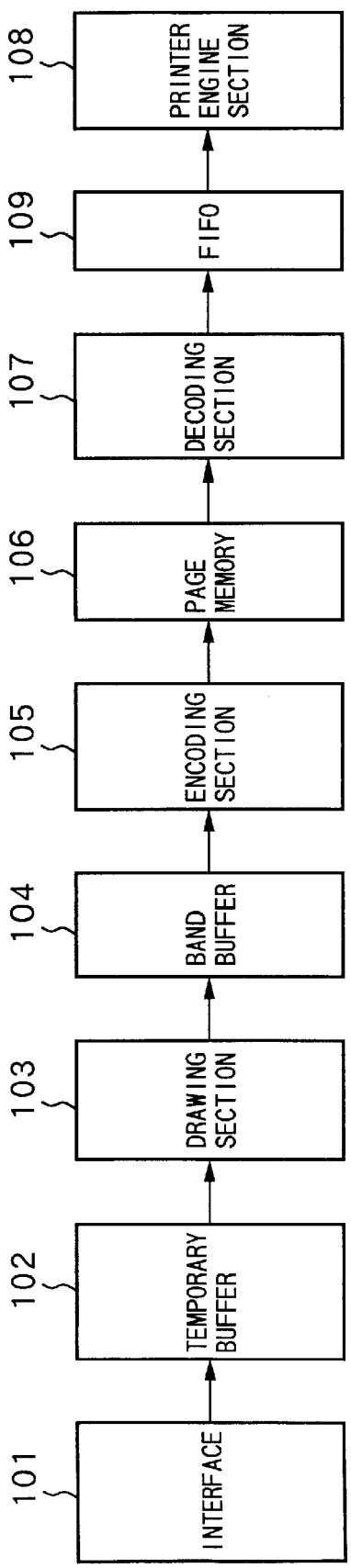

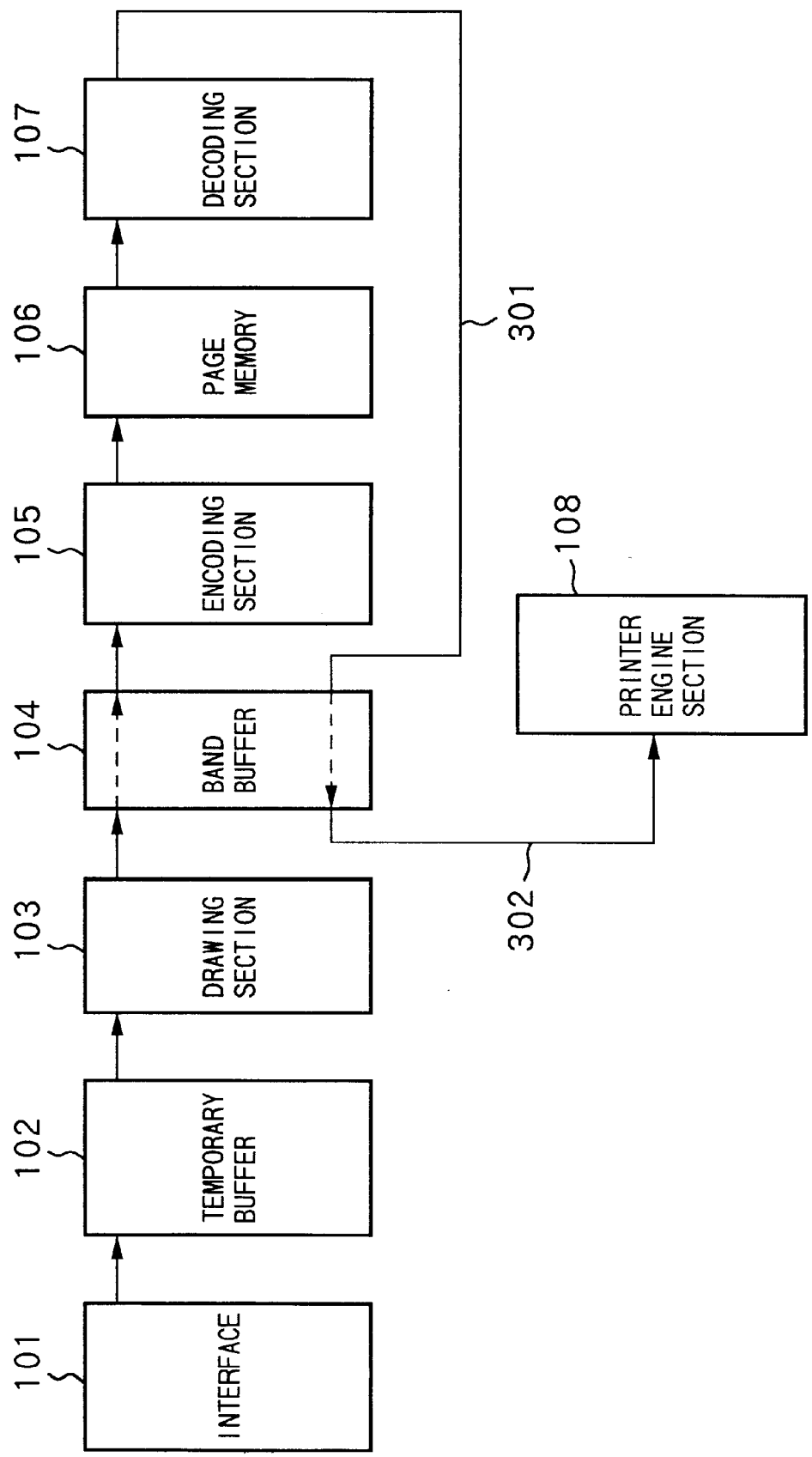

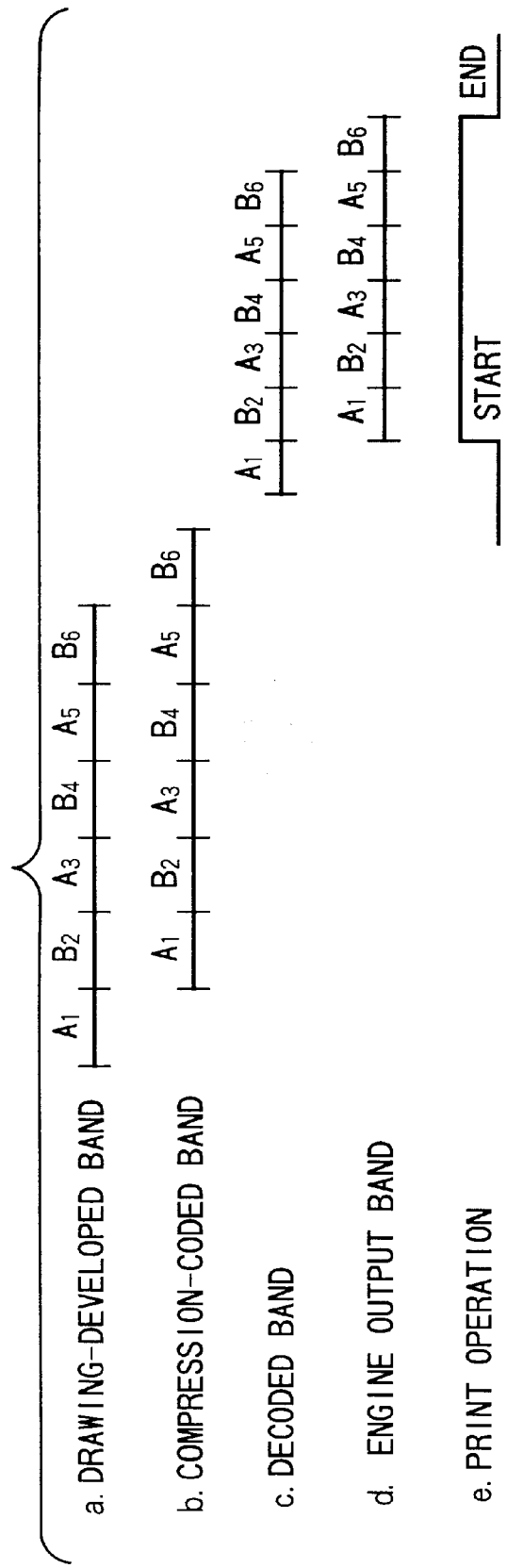

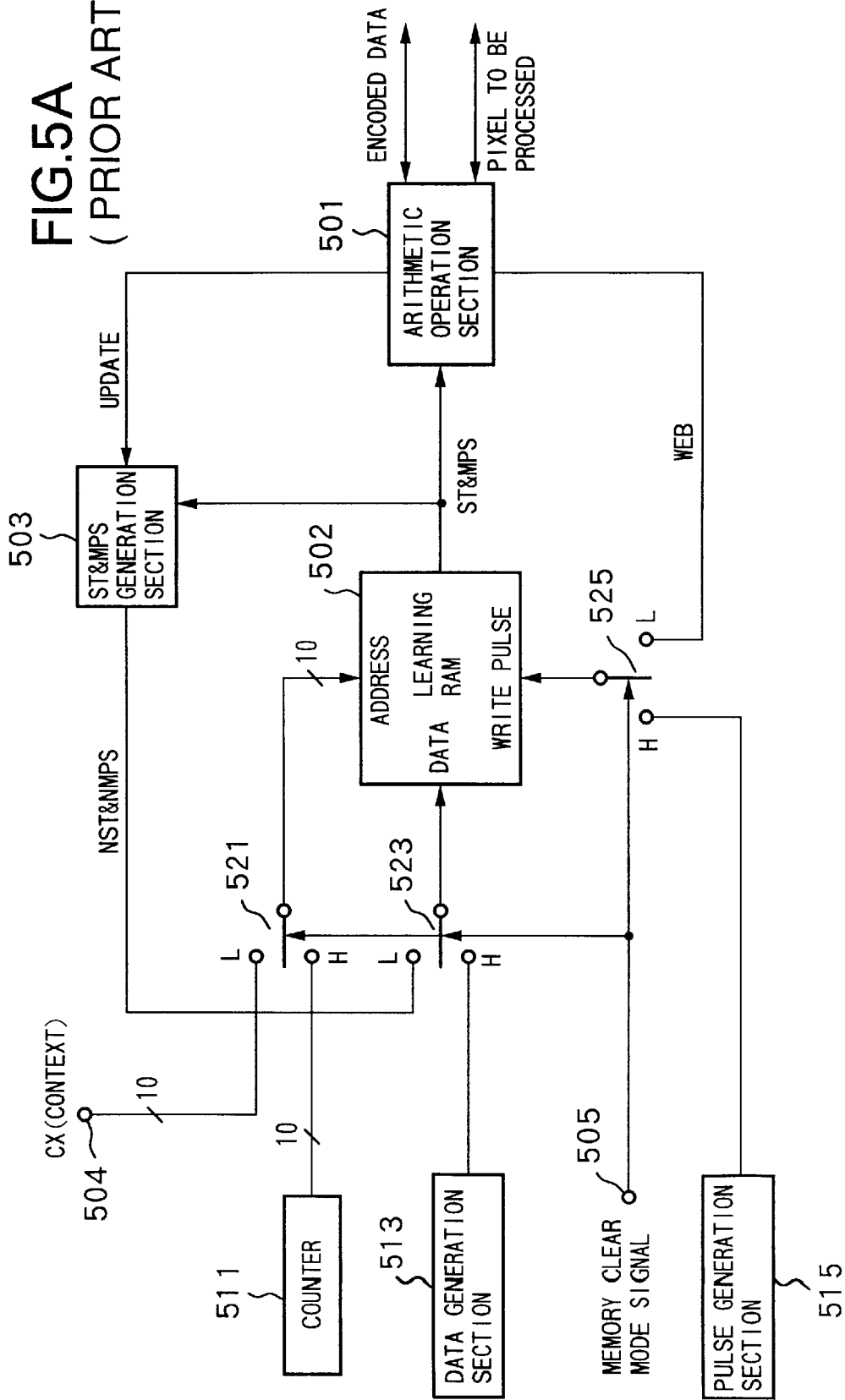

ENCODING AND DECODING APPARATUSES AND IMAGE PROCESSING APPARATUS USING THE SAME

BACKGROUND OF THE INVENTION

The present invention relates to encoding and decoding apparatuses, and an image processing apparatus using the same.

Conventionally, image data or page description language (to be abbreviated as PDL hereinafter) data transferred from a computer to an image output device such as a printer is developed for drawing in the output device. Every time the data is developed for drawing, bitmap data is sent to the printer engine section. However, when contents to be developed for drawing are complex, the drawing development speed maybe lower than the drawing speed of the engine section. In this case, bitmap data developed for drawing is temporarily stored in a memory (this memory is called a page memory). After drawing development is complete in units of pages, and the bitmap data is stored in the memory, the bitmap data is sequentially sent to the printer engine section from the top of the page.

Assume that the size of paper on which the data is printed is A3, and the resolution is 600 dpi. In this case, even when the data is binary data in which the number of bits per pixel is 1, the total bitmap data amount becomes as large as 8 MB, and the large-capacity memory increases the printer cost.

To prevent this, an arrangement as shown in FIG. 1 has been examined. Data received from a computer sequentially passes through an interface section 101 for receiving the data from the computer, a temporary buffer 102 for temporarily storing the data received from the computer, a drawing section 103 for developing the data received from the computer for drawing, a band buffer 104 for writing the data developed by the drawing section for drawing, an encoding section 105 for compression-coding the bitmap data in the band buffer, a page buffer 106 for storing the data compression-coded by the encoding section, and a decoding section 107 for decoding the encoded data in the page buffer, and is finally output to a printer engine section 108 for printing bitmap data obtained by decoding. When a plurality of band buffers 104 are used to parallelly execute development processing by the drawing section 103 and encoding processing by the encoding section 105, the processing speed can be increased.

With this arrangement, the page memory capacity decreases from 8 MB in the arrangement without compression to about ½ to ¼. Instead, the band buffer 104 must be used, and the memory capacity increases accordingly. However, when the drawing development unit (this unit is called a band) is set to be a 1/16 to 1/20 page, the memory capacity can be decreased in total.

As the encoding scheme of the encoding section 105, a compression scheme which guarantees a predetermined value as the lowest compression ratio for arbitrary bitmap data (text, graphic, or image data) is desired because of the strong requirement for cost reduction and the purpose of minimizing the page memory capacity. As such a compression scheme, JBIG encoding having a function of learning the two-dimensional features of bitmap data to be compressed can be used.

In JBIG encoding, learning is performed by updating the contents of a RAM for holding a predictive state. This learning (update of the contents of the RAM) occurs at an irregular timing, and the time required for encoding/decoding becomes long because of the write operation in the memory. Conversely, if learning (update of the contents of the RAM) need not be performed, the encoding/decoding time shortens. When encoded data is decoded by JBIG, the rate of data output from the decoding section 107 is not constant, so the output cannot be directly output to the printer engine section 108. To solve this, a FIFO (First In First Out) memory 109 is inserted between the decoding section 107 and the printer engine section 108. The bitmap data output from the decoding section 107 is smoothed over time and then output to the printer engine section 108.

The present inventor has proposed the following processing method in a patent filed by the present applicant previously. FIG. 3 shows the arrangement of this new proposal. The proposal contents are different from FIG. 2 in the following two points.
(1) Bitmap data decoded by the decoding section 107 is written in the band buffer 104.
(2) The bitmap data written in the band buffer 104 is output to the printer engine 108 at a predetermined timing.

The differences from FIG. 2 are a data path 301 for processing (1) and a data path 302 for processing (2).

As the difference in function, processing of smoothing the bitmap data over time is performed not by the FIFO 109 but the band buffer 104, unlike FIG. 2. In FIG. 2, the band buffer 104 operates during drawing development and encoding. In the example of FIG. 3, however, the band buffer 104 also operates during decoding.

The operation timing is shown in FIG. 4. For the descriptive convenience, bitmap data of one page is divided into six bands, and the bands are named A1, B2, A3, B4, A5, and B6 from the upper side. To increase the throughput of processing, the band buffer 104 has a double buffer structure, and the two buffers are called a buffer A and a buffer B, respectively.

Drawing development processing in the band buffers is performed in the order of A1, B2, A3, B4, A5, and B6 (a in FIG. 4). A1, A3, and A5 are developed in the buffer A, and B2, B4, and B6 are developed in the buffer B. Since development of A1 is ended before the start of development of B2, compression coding of A1 is performed in parallel to development of B2 (b in FIG. 4). Subsequently, compression coding of B2 is performed in parallel to development of A3, and finally, B6 is compression-coded. When all bitmap data of one page are compression-coded, the compressed data are decoded.

Decoding is also performed in the order of A1, B2, A3, B4, A5, and B6 (c in FIG. 4), like encoding. The bitmap data A1 of one band decoded by the decoding section 107 is written in the buffer A. Subsequently, the decoded bitmap data B2 of one band is written in the buffer B. In parallel to the write in the buffer B, the bitmap data is read out from the buffer A and sent to the printer engine section 108 (d in FIG. 4), and printing of one page is started (e in FIG. 4).

Subsequently, in parallel to the write of the decoded bitmap data A3, B2 is read out and transferred to the printer engine 108, and finally, B6 is read out and transferred to the printer engine 108. With this processing, all bitmap data of one page are sent to the printer engine 108, and print output is ended (e in FIG. 4).

FIG. 5A is a block diagram of conventional JBIG encoding and decoding apparatuses used as the encoding section 105 and decoding section 107 in FIGS. 1 to 3. The operation will be briefly described.

Referring to FIG. 5A, reference numeral 501 denotes an arithmetic operation section for performing arithmetic operation in JBIG; 502, a learning RAM for holding a predictive state; 503, an ST & MPS generation section for generating expectation data to be stored in the learning RAM 502; 504, a terminal for inputting context (CX); 505, a terminal for inputting an mode signal to exchange address signal and data signal for RAM 502 in the memory clear mode; 511, a counter for generating an address signal for the learning RAM 502 in the memory clear mode; 513, a data generation section for generating zero data to be written in the learning RAM 502 in the memory clear mode; 515, a pulse generation section for generating a write pulse to be supplied to the learning RAM 502 in the memory clear mode; and 521, 523, and 525, selectors.

Before encoding or decoding, a memory clear mode signal (High) is input to the terminal 505 to clear the learning RAM 502. When this signal goes high, the selector 521 selects the counter 511, the selector 523 selects the data generation section 513, and the selector 525 selects the pulse generation section 515. While the mode signal is at low level, the counter 511 is reset to zero. When the mode signal goes high, the counter 511 starts a count-up operation. The counter value is supplied to the address terminal of the learning RAM 502 through the selector 521 to access all addresses of the learning RAM 502. Simultaneously, zero data is supplied from the data generation section 513 to the data input terminal of the learning RAM 502 through the selector 523, and a memory write pulse signal is generated by the pulse generation section 515 and supplied with the write pulse input signal to the learning RAM 502 through the selector 525. When the learning RAM 502 is completely cleared by the above operation, the memory clear mode signal inputted from the terminal 505 goes low.

The context (CX) input from the terminal 504, data NST (NEXT STATE; the next predictive state) and NMPS (NEXT MPS; the next superior symbol) generated by the ST & MPS generation section 503, and a pulse generated by a control circuit in the arithmetic operation section 501 are input to the address terminal, data input terminal, and write pulse input terminal of the learning RAM 502, respectively. After this, the encoding or decoding operation is started.

A plurality of reference pixel data are supplied to the address terminal of the learning RAM 502 as context, and a predictive state ST and superior symbol MPS corresponding to the context are read out. These pieces of information are sent to the arithmetic operation section 501, so the arithmetic operation is performed on the basis of these pieces of information. It is determined on the basis of the calculation result whether the contents of the learning RAM 502 are to be updated. If the contents are to be updated, a memory write pulse signal is supplied to the learning RAM 502 through the selector 525. Simultaneously, the ST & MPS generation section 503 generates data NST & NMPS to be newly stored in the learning RAM 502, on the basis of the data ST & MPS.

Of the data ST & MPS output from the learning RAM 502, the predictive state ST is converted into an estimated probability value LSZ (size of an inferior symbol; estimated probability value) and used for the arithmetic operation. In this example, the predictive state ST is used for control. However, the estimated probability value LSZ itself may be stored in the learning RAM 502.

FIG. 5B shows the arrangement of the arithmetic operation section 501. This will be briefly described.

Referring to FIG. 5B, reference numeral 5001 denotes an A register representing the interval size; 5002, a C register as a code register; 5003, an estimated probability value LSZ as an estimated appearance probability converted from the predictive state ST; 5004, 1-bit information to be encoded, which corresponds to the exclusive NOR output of the pixel data (PIX) and the superior symbol (MPS); 5005, a shift amount encoding circuit for obtaining a shift amount from the value (A−LSZ) or LSZ; 5006, a subtraction/selector section for outputting the value (A−LSZ) or LSZ; 5007, an addition/selector section for outputting the value {C+(A−LSZ)} or LSZ; 5008, a first shifter for shifting the output from the subtraction/selector section 5006 on the basis of the shift amount output from the shift amount encoding circuit 5005; 5009, a second shifter for shifting the output from the addition/selector section 5007 on the basis of the shift amount output from the shift amount encoding circuit 5005; 5010, a terminal for outputting encoded data shifted out from the second shifter; and 5011, a terminal for outputting an update designation signal UPDATE to the ST & MPS generation section 503.

The outputs from the shift amount encoding circuit 5005, the subtraction/selector section 5006, and the addition/selector section 5007 are switched on the basis of the 1-bit encoded information (output from the exclusive NOR gate). When the 1-bit information is at "1", a shift amount based on the value (A−LSZ) is output from the shift amount encoding circuit 5005, the value (A−LSZ) is output from the subtraction/selector section 5006, and the value {C+(A−LSZ)} is output from the addition/selector section 5007. When the 1-bit information is at "0", a shift amount based on the LSZ is output from the shift amount encoding circuit 5005, the value LSZ is output from the subtraction/selector section 5006, and the value C is output from the addition/selector section 5007.

As described above, as a general arrangement, encoding of the shift amount, calculation of (A−LSZ), and calculation of {C−(A−LSZ)} are sequentially performed.

FIG. 13 is a flow chart schematically showing the flow of the conventionally known encoding processing. FIG. 15 is a general flow chart of the encoding algorithm "ENCODE". The conventional encoding operation will be described with reference to FIGS. 13 and 15.

Step 1900 represents read processing. The predictive state ST and predictive symbol MPS corresponding to the pixel to be encoded are read out from the learning RAM 502. The address input in read processing has a value generated from the reference pixel group around the pixel PIX to be encoded. The shape of the reference range is called a template. FIG. 14 shows an example of the template used for JBIG encoding. In this example, a pixel 2010 is a pixel to be encoded, and 10 pixels 2000 to 2009 correspond to the reference pixel group. Data obtained by making the colors of the 10 pixels to correspond to 10-bit binary numbers is called the context CX. For the template of 10 bits, 1,024 values from 0 to 1023 are available as the value of the context.

In estimated probability value decoding processing in step 1901, the predictive state ST read out in step 1900 is converted into the estimated probability value LSZ proportional to the inferior symbol appearance probability. Subsequently, the arithmetic operation is performed using the data PIX, MPS, and LSZ. In JBIG encoding, the estimated probability value LSZ and superior symbol MPS, which are determined in units of contexts, must be adaptively updated during the process of encoding. In step 1902, it is determined on the basis of calculation α whether this update processing need be performed. This processing corresponds to the calculation of (A=LSZ) in steps 2100, 2102, 2102*a*, and 2101*b* in FIG. 15. More specifically, update processing is executed when PIX≠MPX, or the calculation result of (A−LSZ) is smaller than 0×8000. When update processing is selected, calculation β and write processing are performed in step 1903.

Step 1903 is processing to be performed when update processing is necessary. In write processing in the learning RAM 502, the next predictive state NST and next superior symbol NMPS are written in the learning RAM 502. The write address is the context of the current pixel to be processed, which has been used for read processing. Calculation β corresponds to processing in steps 2103a, 2103b, 2104a, 2104b, and 2109 in FIG. 15. Write processing corresponds to processing in steps 2105 to 2108 in FIG. 15. If update processing need not be executed, calculation β and write processing are not performed. Instead, calculation γ in step 1904 is performed, and the flow advances to processing of the next pixel. Calculation γ is performed when update processing is unnecessary and corresponds to processing of substituting the result of (A−LSZ) into the A register in steps 2101a and 2101b in FIG. 15.

As is obvious to a person skilled in the art, decoding can be performed by executing processing reverse to the above-described encoding processing while inputting encoded data to the C register, and a detailed description thereof will be omitted.

However, in the conventional encoding and decoding apparatuses, a predetermined time is required to clear the learning memory before encoding or decoding processing. When encoding or decoding is performed in units of bands, as shown in FIGS. 1 to 3, a processing time is required to clear the learning RAM in units of bands. This makes it difficult to continuously encode or decode band data and imposes limitations on an increase in processing speed.

SUMMARY OF THE INVENTION

It is an object of the present invention to provide encoding and decoding apparatuses capable of solving the above problem of the prior art and increasing the processing speed even when the learning RAM need be frequently cleared for encoding or decoding in units of bands, and an image processing apparatus using the same In order to achieve the above object, according to the present invention, there is provided an encoding/decoding apparatus having a learning function, comprising a plurality of storage means for storing learned contents, and control means for setting one of the plurality of storage means in a learning state and the other in an initialized state and switching the state for every predetermined processing. Encoding is predictive coding complying with JBIG, and the apparatus has two learning memories as the plurality of storage means. The predetermined processing corresponds to a processing unit of an apparatus using the predictive coding apparatus.

According to the present invention, there is also provided an encoding/decoding apparatus having a learning function, comprising first storage means for storing learned contents, second storage means for dividing encoding into a plurality of sequences and storing data corresponding to a current sequence number, and control means for, when a sequence number stored in the second storage means is different from a sequence number of encoding which is progressing, inhibiting the learned contents read out from the first storage means from being used for encoding, wherein a function of initializing the learned contents of the first storage means is realized every time the sequence progresses without initializing the first storage means. The data stored in the second storage means is inverted every time the sequence progresses. The second storage means comprises a storage section for performing a read and write in units of a plurality of addresses and means for separating the readout data in units of addresses.

The encoding/decoding apparatus is applied to an image processing apparatus, and when an image of one page is to be divided into a plurality of bands and processed, switching of the state or progress of the sequence corresponds to a processing shift from a band to another band.

According to the present invention, there is also provided an image processing apparatus for dividing an image of one page into a plurality of bands, encoding each band by an encoding apparatus and storing the band, and then decoding the band by a decoding apparatus and outputting the band, wherein each of the encoding and decoding apparatuses comprises a plurality of storage means for storing learned contents, and control means for setting one of the plurality of storage means in a learning state and the other in an initialized state and switching the state for every predetermined processing.

According to the present invention, there is also provided an image processing apparatus for dividing an image of one page into a plurality of bands, encoding each band by an encoding apparatus and storing the band, and then decoding the band by a decoding apparatus and outputting the band, wherein each of the encoding and decoding apparatuses comprises first storage means for storing learned contents, second storage means for dividing encoding into a plurality of sequences and storing data corresponding to a current sequence number, and control means for, when a sequence number stored in the second storage means is different from a sequence number of encoding which is progressing, inhibiting the learned contents read out from the first storage means from being used for encoding.

According to the present invention, encoding and decoding apparatuses capable of increasing the processing speed even when a learning RAM need be frequently cleared for encoding or decoding in units of bands, and an image processing apparatus using the same can be provided.

More specifically, learning memory clear processing before JBIG encoding/decoding processing takes a predetermined time. When encoding/decoding is performed in units of bands, a processing time is required to clear the learning RAM in units of bands. Conventionally, it is hard to continuously encode/decode band data. In the present invention, as the first solution to the problem, two learning RAMs are used, and one is cleared while the other is used. As the second solution to the problem, a band sequence storage memory for storing a band sequence number for every address of the learning RAM, a counter for performing a count-up operation every time the band changes, matching detection means for detecting whether the sequence matches the counter value, and means for masking the readout contents of the learning RAM on the basis of the output from the matching detection circuit are arranged to instantaneously and apparently clear the learning RAM.

With the above arrangement, even when a processing time for clearing the learning RAM in units of bands, as in the prior art, the learning RAM can be properly cleared.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing an arrangement in which a FIFO for smoothing bitmap data output from a decoding section over time is inserted between the decoding section and the engine section shown in FIG. 1;

FIG. 3 is a block diagram showing the arrangement of an image processing apparatus having a path for outputting bitmap data from the decoding section to the band buffer section in FIG. 1;

FIG. 4 is a view showing the timing of drawing development and compression/expansion processing in the image processing apparatus shown in FIG. 3;

FIG. 5A is a block diagram showing the arrangement of a conventional JBIG encoding/decoding apparatus;

DETAILED DESCRIPTION OF THE PREFERRED EMBODIMENTS

First Embodiment

Figure 6:
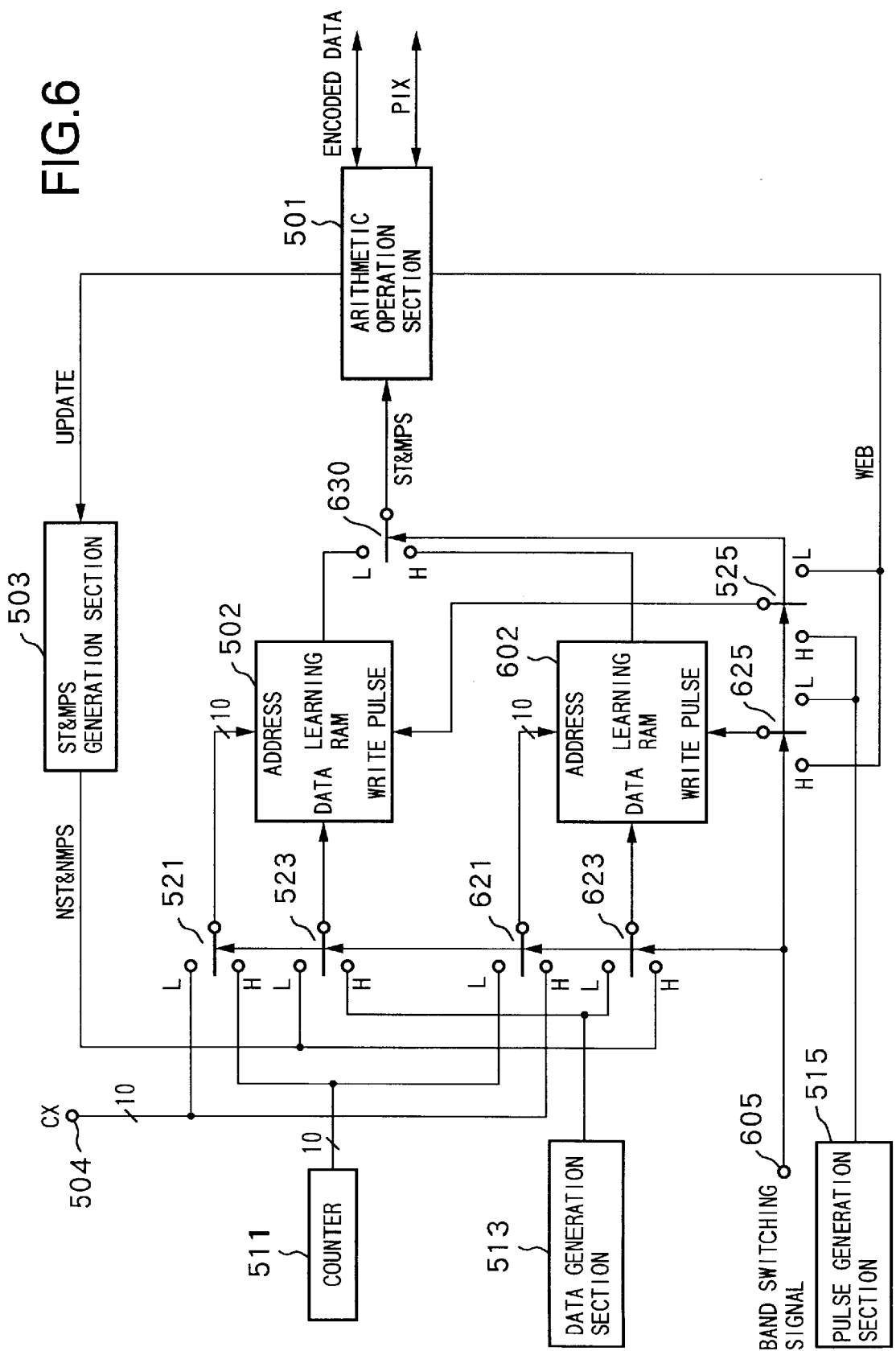
FIG. 6 is a block diagram showing the arrangement of an encoding/decoding apparatus according to the first embodiment of the present invention.

FIG. 6 shows an encoding/decoding apparatus according to the first embodiment of the present invention. In this embodiment, two learning RAMs having the same capacity are used.

Figure 1:
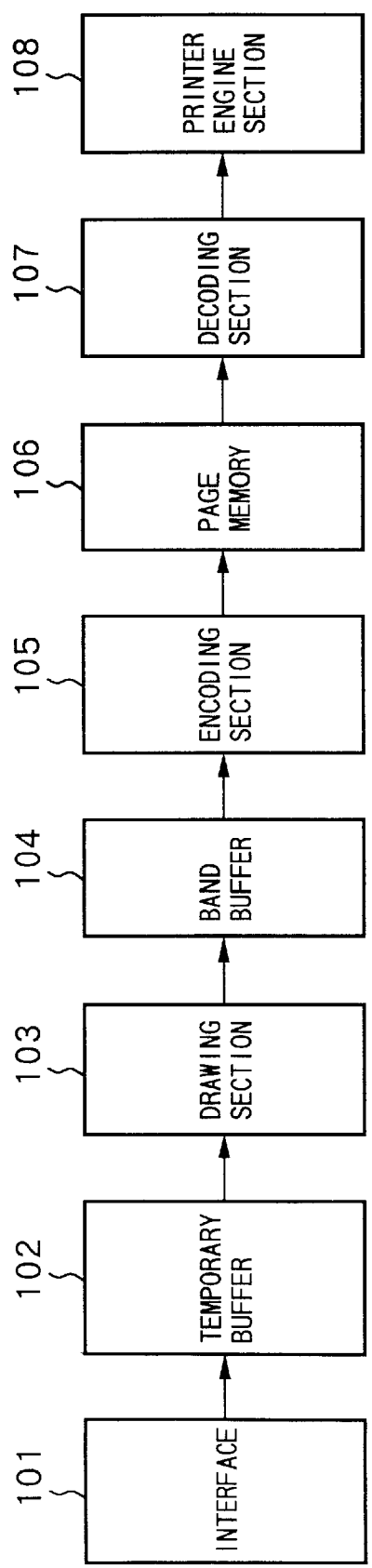
FIG. 1 is a block diagram showing the arrangement of an image processing apparatus in which a page memory capacity is reduced by introducing encoding and decoding processing.
Figure 5B:
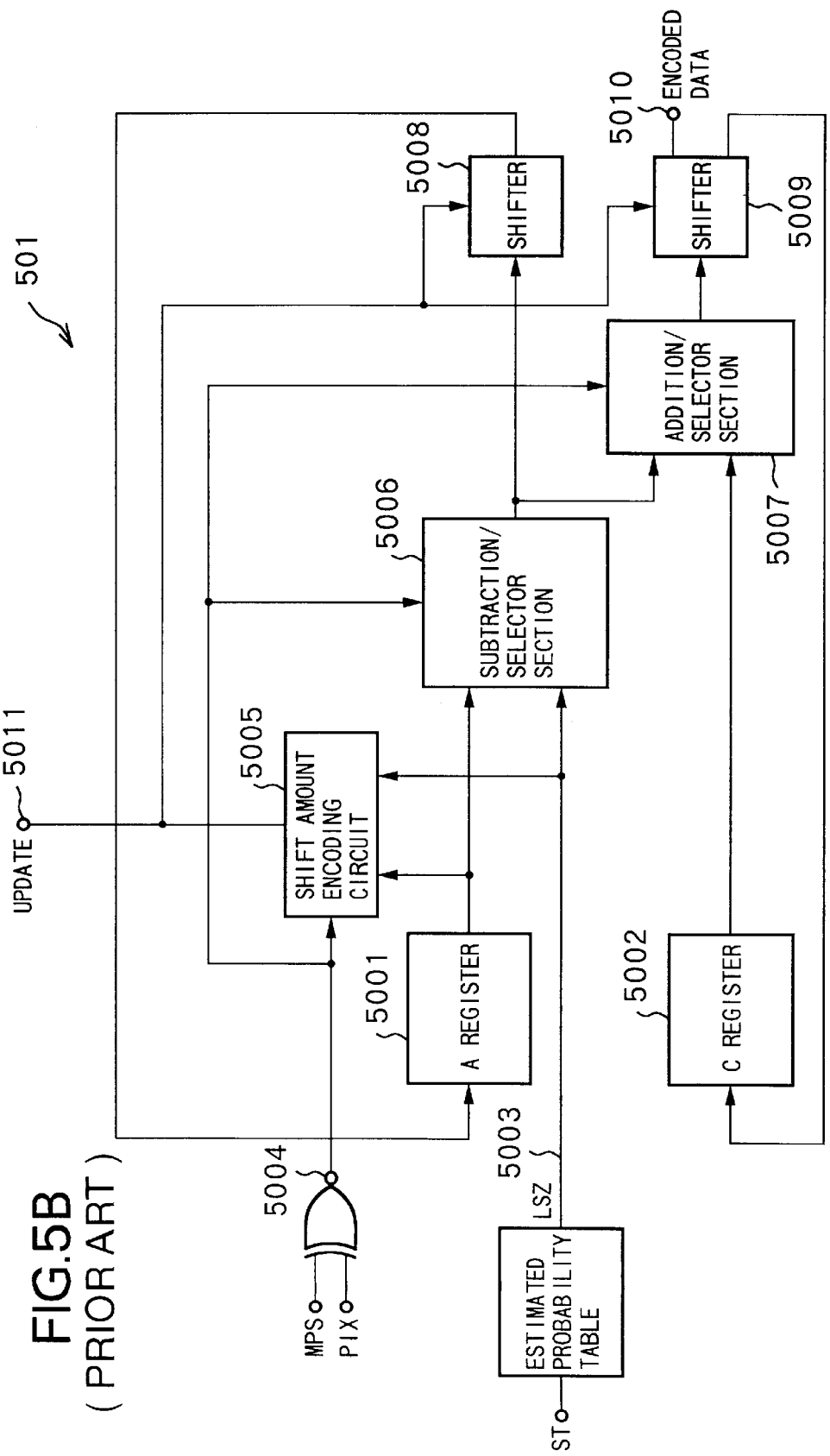
FIG. 5B is a block diagram showing the arrangement of a conventional arithmetic operation section.

Referring to FIG. 6, reference numerals 501 to 525 denote the same parts as in the prior art shown in FIG. 5, and a detailed description thereof will be omitted.

Reference numerals 602, 621, 623, and 625 denote parts having the same functions as those of the elements 502, 521, 523, and 525, respectively; 605, a terminal for inputting a band switching signal which is alternately switched to "High" and "Low" every time the band is switched; and 630, a selector for selecting one of the outputs from the two learning RAMs 502 and 602.

Before encoding or decoding for the first time, the band switching signal is set at "High", and the counter 511 is reset to zero by a reset signal (not shown). As described above about the prior art, the learning RAM 502 is cleared This clear processing takes a predetermined time. After clear processing is ended, the band switching signal is set at low level, and the first band is encoded or decoded.

During encoding or decoding, the other learning RAM 602 is cleared in the same manner as in clearing the learning RAM 502.

The data amount (number of pixels) of one band corresponds to several tens of hundreds to several tens of thousands pixels. However, since a learning RAM has only 1,024 addresses, the clear processing is immediately complete. When one band data is completely encoded or decoded, the band switching signal is switched from "Low" to "High", and the next band is encoded or decoded using the cleared learning RAM 602. At this time, the learning RAM 502 is cleared, as a matter of course.

In the same manner as described above, the remaining bands are encoded or decoded.

Second Embodiment

Figure 7:
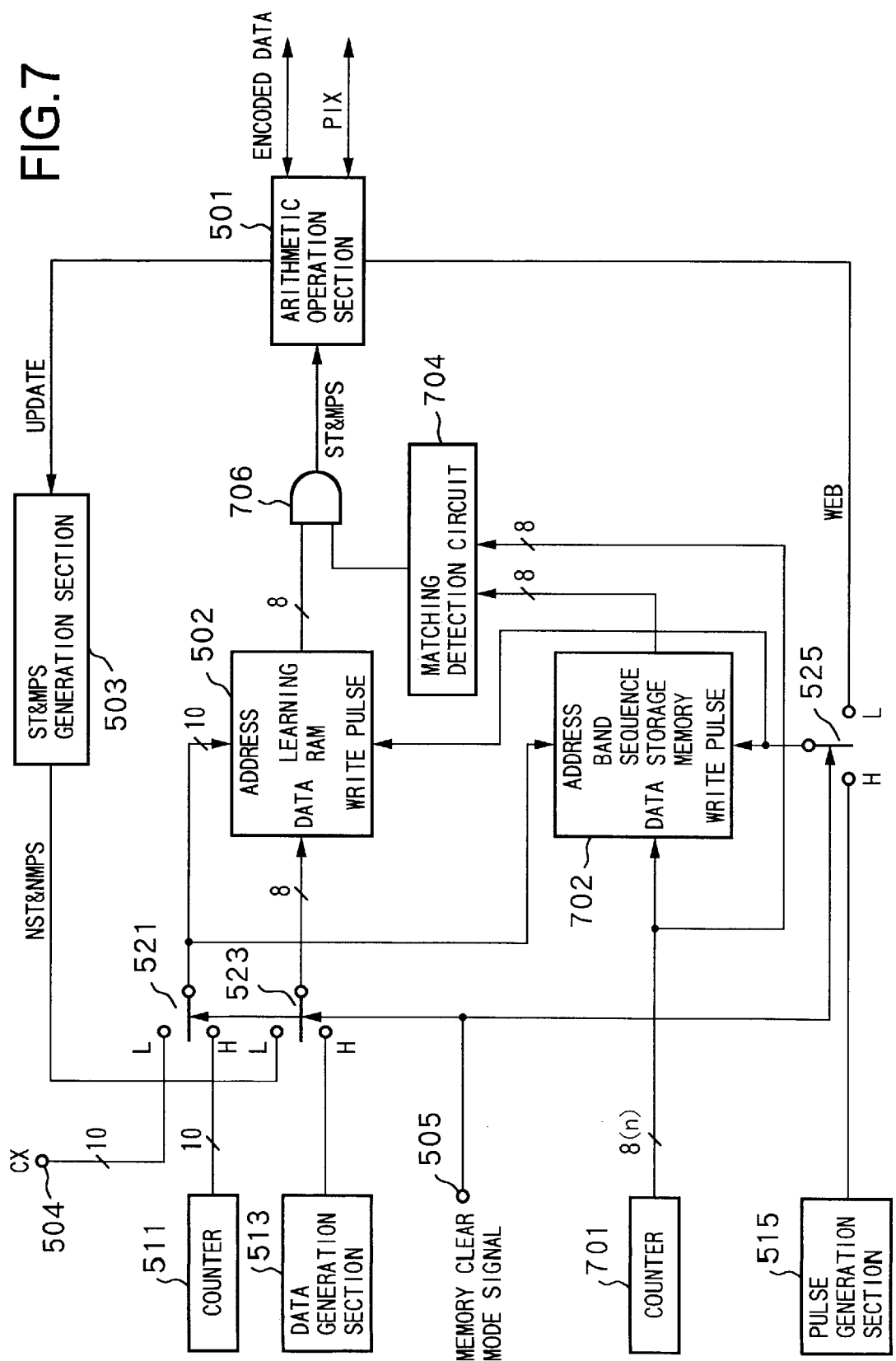
FIG. 7 is a block diagram showing the arrangement of an encoding/decoding apparatus according to the second embodiment of the present invention.

FIG. 7 shows an encoding/decoding apparatus according to the second embodiment of the present invention. In this embodiment as well, two memories having the same capacity are used, as in the first embodiment. However, one is the conventional learning RAM, and the other is used to store a band sequence number.

Referring to FIG. 7, reference numerals 501 to 525 denote the same parts as in the prior art shown in FIG. 5, and a detailed description thereof will be omitted.

Reference numeral 701 denotes an 8-bit counter for generating a band sequence number representing the number of processed bands, 702, a band sequence storage memory for storing the band sequence number, which has the same capacity as that of the learning RAM 502, as described above; 704, a matching detection circuit for detecting whether the value read out from the band sequence storage memory 702 equals the output value from the counter 701; and 706, a mask circuit 706 for masking the output from the learning RAM 502 on the basis of the detection result from the matching detection circuit 704.

The first memory clear method is similar to the conventional method. First, a memory clear mode signal (High) is input to the terminal 505 before encoding or decoding to clear the learning RAM 502. When this signal goes high, the selector 521 selects the counter 511, the selector 523 selects the data generation section 513, and the selector 525 selects the pulse generation section 515. While the mode signal is at low level, the counter 511 is reset to zero. When the mode signal goes high, the counter 511 starts a count-up operation. The counter value is supplied to the address terminals of the learning RAM 502 and band sequence storage memory 702 through the selector 521 to access all addresses of the two memories.

Simultaneously, zero data is supplied from the data generation section 513 to the data input terminal of the learning RAM 502 through the selector 523, and the output value from the counter 701 cleared to zero in response to a reset signal (not shown) is supplied to the data input terminal of the band sequence storage memory 702. A memory write pulse signal is generated by the pulse generation section 515 and supplied to the write pulse input terminals of the learning RAM 502 and band sequence storage memory 702 through the selector 525.

When the learning RAM 502 and band sequence storage memory 702 are completely cleared by the above operation, the first memory clear processing is ended, and the memory clear mode signal input from the terminal 505 goes low.

This embodiment has its characteristic feature in the subsequent memory clear method. The contents thereof will be briefly expressed.

(1) Actual memory clear processing is performed only once for the first time, and after this, no clear processing is performed.
(2) Apparent clear processing is performed by masking the output from the learning RAM 502 to zero by the mask circuit 706.
(3) At an address which is accessed for the first time after the band to be processed has changed, the sequence number (output from the memory 702) read out in accordance with the address does not match the output value from the counter 701 (this value is counted up when the band has changed). For this reason, the output from the matching detection circuit 704 becomes zero, and the above processing (2) is performed.
(4) When the learning RAM 502 is updated once at an address corresponding to an nth band, the contents of the band sequence storage memory 702 at this address are rewritten to the value in the counter 701. After this, the output from the learning RAM 502 becomes valid without being masked.

The capacity of the learning RAM 502 in JBIG corresponds to 1,024 addresses×8 bits. The memory 702 also has the same capacity. When the band sequence number is equal to or smaller than 255, the second embodiment poses no problems. Once the first actual memory clear processing is executed, apparent clearing is performed, i.e., actual clearing is not performed.

The following applications are possible in this embodiment.

When the band sequence number is always ($2^n-1$), the counter 701 only needs n bits, and the bit width of the band sequence storage memory 702 also only needs n bits. The band sequence number will be briefly described. When data of one page is divided into 16 bands, these bands are sequentially processed, and one band is processed only once, the band sequence numbers are 0 to 15. However, although one page data is divided into 16 bands, when bitmap data which has been encoded once is temporarily decoded for an overwrite, and then encoded again, the band sequence number exceeds 15. In this case, the upper limit of the number may be set at 63, and the bit width of each of the counter and memory may be set to be 6 bits.

Third Embodiment

An encoding/decoding apparatus according to the third embodiment of the present invention will be described.

As described in the last description of the second embodiment, the band sequence number sometimes becomes larger than the number of bands per page. However, the situation largely differs between encoding and decoding. In encoding, when overwrite processing is performed, as described above, the band sequence number can infinitely becomes large. However, encoding processing can be temporarily stopped upon switching the band to clear the learning RAM or the like (decoding processing before the overwrite is included in encoding processing).

On the other hand, in decoding processing (when decoded data is output to the image output engine of, e.g., an LBP), the bands are sequentially processed starting from the first band of one page, and each band is processed only once. For this reason, the maximum value of the sequence number is determined in correspondence with the number of bands. However, since the decoded data output destination is the image output engine, decoding processing cannot be stopped for the purpose of clearing the memory.

To prevent delay in decoding processing, the bit width of each of a counter 701 and band sequence storage memory 702 is determined in accordance with the number of bands per page. With this arrangement, the storage memory can have a minimum and necessary capacity. In encoding, the band sequence number may readily exceed the bit width of the counter 701. In this case, the number of bits of the counter 701 is set to be n bits. Every time $2^n$ bands are processed, encoding processing is temporarily stopped to clear the learning RAM or the like, thereby coping with decoding processing.

The block diagram of the encoding/decoding apparatus of this embodiment is almost the same as that in FIG. 7 of the second embodiment except that the bus width of input/output data of the counter 701 and band sequence storage memory 702 changes.

Figure 8:
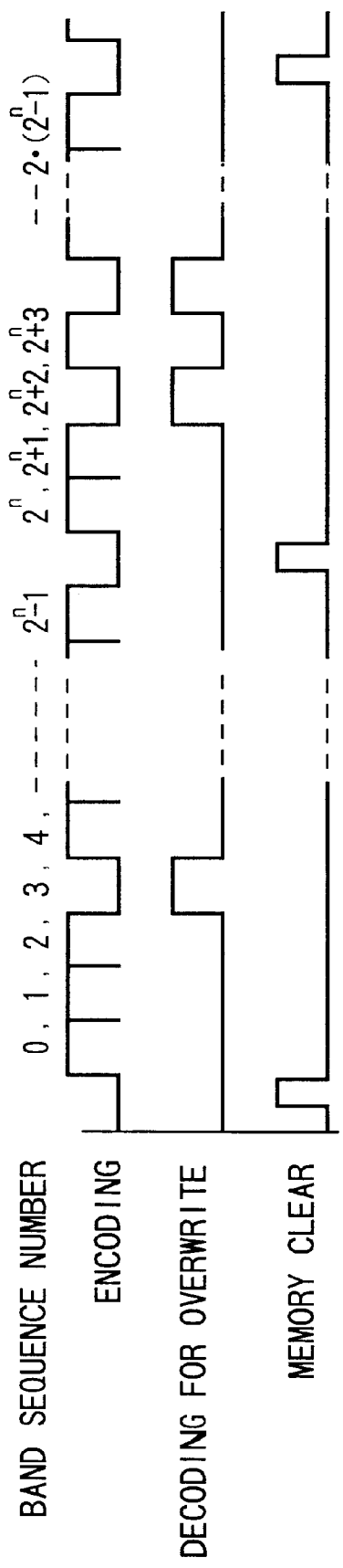
FIG. 8 is a timing chart showing the operation of the third embodiment of the present invention.

The processing timing is slightly different from that in the second embodiment and, more specifically, the memory such as the learning RAM is cleared in encoding a plurality of number of times. This is shown in FIG. 8.

Fourth Embodiment

Figure 9:
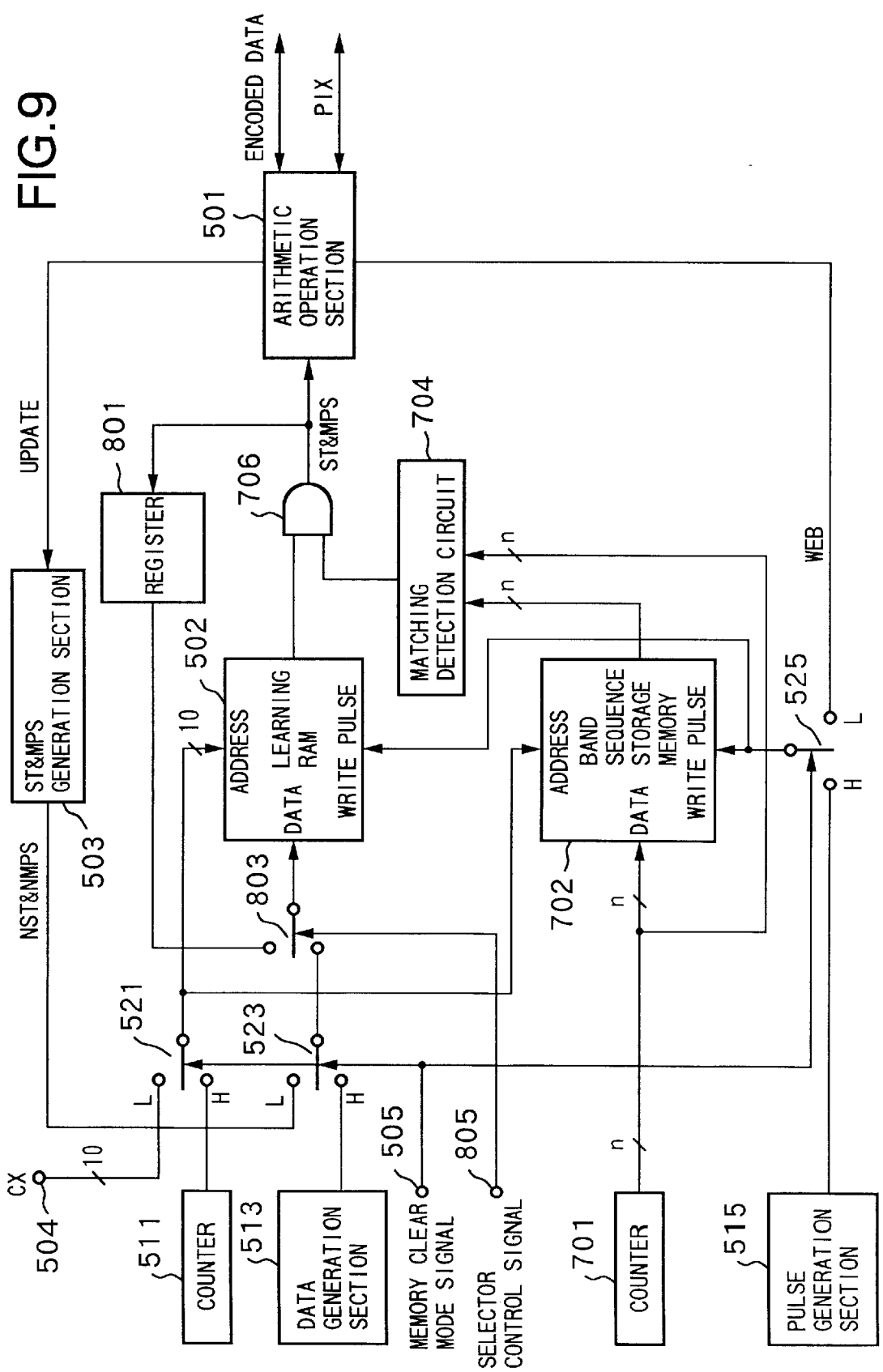
FIG. 9 is a block diagram showing the arrangement of an encoding/decoding apparatus according to the fourth embodiment of the present invention.

FIG. 9 is a block diagram of an encoding/decoding apparatus according to the fourth embodiment of the present invention. This block diagram is almost the same as that of the third embodiment. In this embodiment, however, when the learning RAM or the like is to be cleared, encoding processing can be continuously performed without being temporarily stopped.

To clear the learning RAM or the like almost in parallel to encoding processing, the apparatus has a register 801 capable of holding data read out from a learning RAM 502 through a mask circuit 706 such that the data can be written in the learning RAM 502, a selector 803 capable of inputting the data to the learning RAM 502, and an input terminal 805 for inputting a selector control signal.

Generally, the image output engine of an LBP or the like must continuously transfer data of one main scanning line although a short idle period is present between lines. During this idle period, the read/write from/in the learning RAM 502 is gradually performed, and all addresses are accessed once within the $2^n$ bands, and the band sequence storage memory 702 is rewritten, thereby apparently clearing the learning RAM 502.

Figure 10:
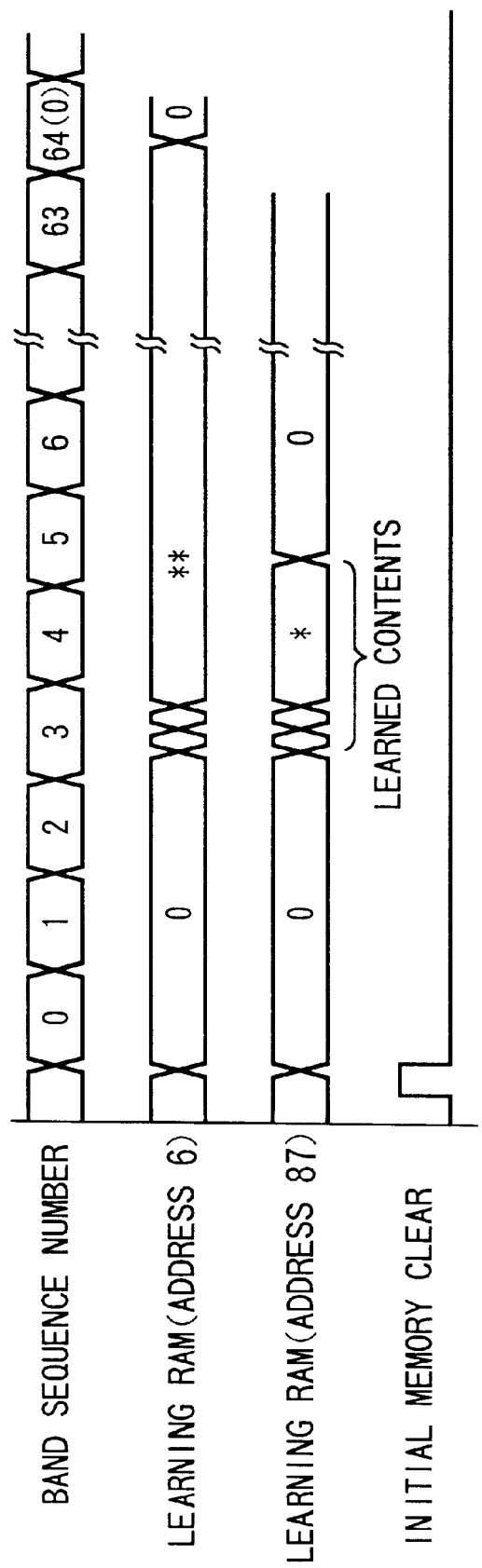
FIG. 10 is a timing chart showing the operation of the fourth embodiment of the present invention.

FIG. 10 is a timing chart of processing of this embodiment. For example, assume that n=6, and $2^n=64$. The read and write at addresses 16m to 16m+15 of the learning RAM 502 are performed using a band sequence number m.

Assume that addresses 6 and 87 of the learning RAM 502 are accessed (memory update) using band sequence number 3. At this time, band sequence number 3 is stored at addresses 6 and 87 of a band sequence storage memory 702. The contents of the learning RAM 502 are always valid as far as the band sequence number is 3. However, when the band to be processed changes, and the band sequence number and the output from a counter 701 become 4, the contents of the learning RAM 502 at addresses 6 and 87 are masked to zero by the mask circuit 706, thereby apparently clearing the memory.

When the band sequence number becomes 5, the value at address 87 is read out, masked to zero by the mask circuit 706, and written, so the data at that address is actually cleared to zero. The contents of the learning RAM 502 at address 6 have not been cleared yet. However, the value is masked to zero by the mask circuit 706, so the apparently cleared state continues. When processing further progresses, and the band sequence number becomes 64 (equivalent to band sequence number 0), the contents of the learning RAM 502 at address 6 are actually cleared to zero.

As described above, the method of this embodiment in which the contents of the learning RAM are cleared using the short data idle period during data transfer to the engine in units of main scanning lines is particularly effective in decoding. This method may be used in decoding while the method of the third embodiment may be used in encoding.

Fifth Embodiment

Figure 11:
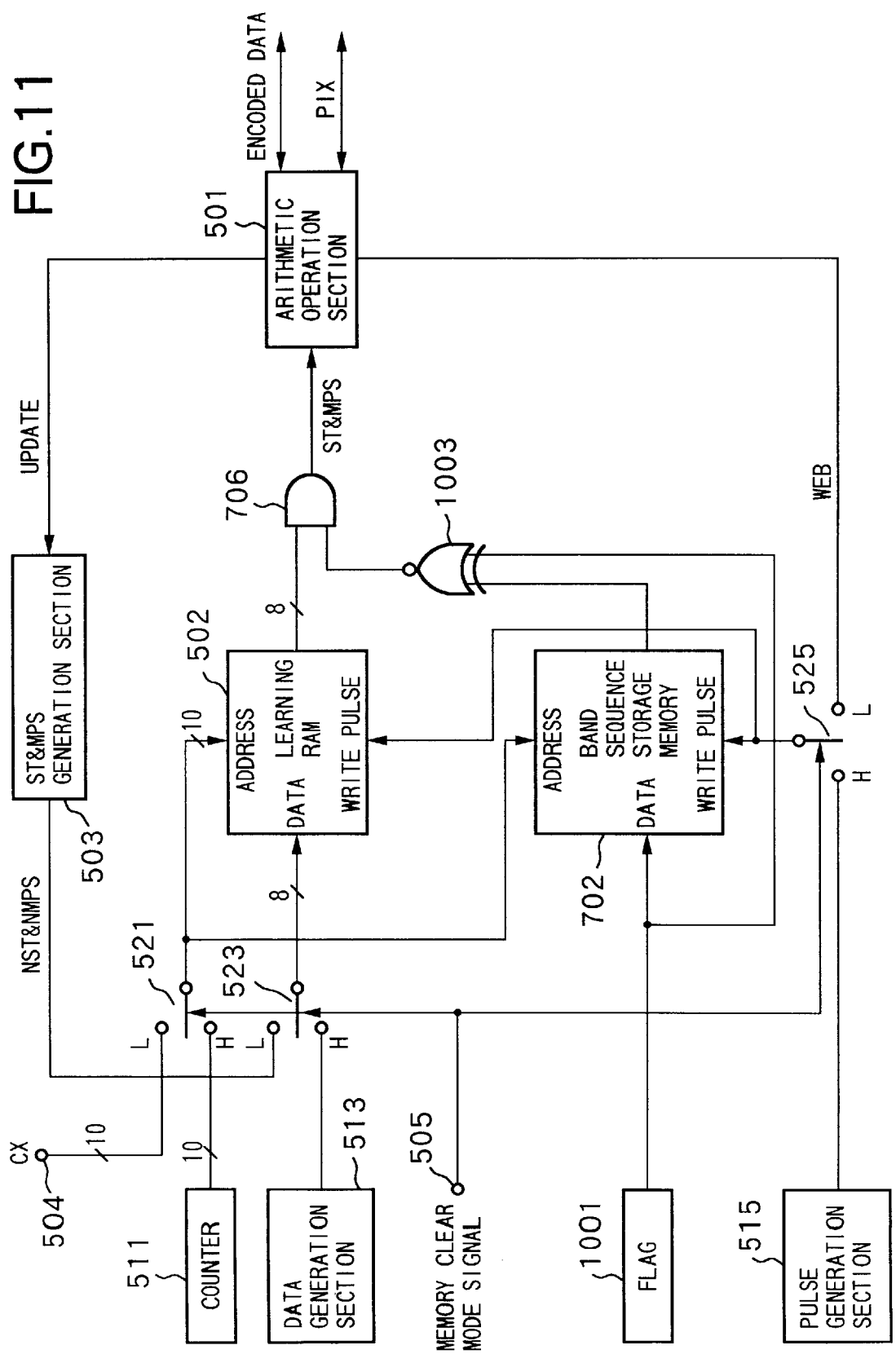
FIG. 11 is a block diagram showing the arrangement of an encoding/decoding apparatus according to the fifth embodiment of the present invention.

FIG. 11 is a block diagram of an encoding/decoding apparatus according to the fifth embodiment of the present invention.

In this embodiment, the bit width of a band sequence storage memory 702 is set to be 1 bit, a flag 1001 for inverting the output value in units of bands is used in place of the counter 701 in the second to fourth embodiments, and an EXNOR (exclusive-NOR) 1003 is used as a matching detection circuit.

This embodiment is equivalent to a case in which n is set to be 1 in the fourth embodiment. In this sense, the fifth embodiment is almost the same as the fourth embodiment. However, when n=1, the scale of hardware to be added is minimized. It is important to described this condition in detail.

Encoding will be described first. As described in the above embodiment, when n=1, encoding processing can be stopped for every two bands to clear the memories including the learning RAM. However, if it is inconvenient to stop encoding processing for every two bands, encoding processing may be stopped for every band, and the memories including the learning RAM may be cleared for every band.

Decoding will be described next. Before decoding processing, the memories including the learning RAM are completely cleared. After this, the first band is decoded. At this time, the value of the flag 1001 is "0". In processing the first band, any other processing need be performed because the memories are cleared. For the next band, the output from the flag 1001 becomes "1". Accordingly, the output from the EXNOR 1003 becomes "0", so the learning RAM is apparently cleared. However, when processing switches to the next band, and the output from the flag returns to "0", the contents of the learning RAM, which have been cleared, are restored. Hence, the learning RAM 502 must be actually cleared while the output from the flag is "1".

Assume that the number of main scanning lines per band is 256. When an operation of reading/writing data from/in the memory at four addresses can be performed during the above-described idle period of data transfer to the engine, the invalid data at all the 1,024 addresses of the learning RAM 502 can be cleared during processing of one band while reserving valid data for the band. This clear processing is performed every time the band to be processed changes from the above band.

When data is read out from the learning RAM 502 for clear processing, the output from the EXNOR 1003 becomes "1" at an address where the learning RAM is updated in the band. For this reason, the write operation may be omitted on the basis of the output.

Sixth Embodiment

Figure 12:
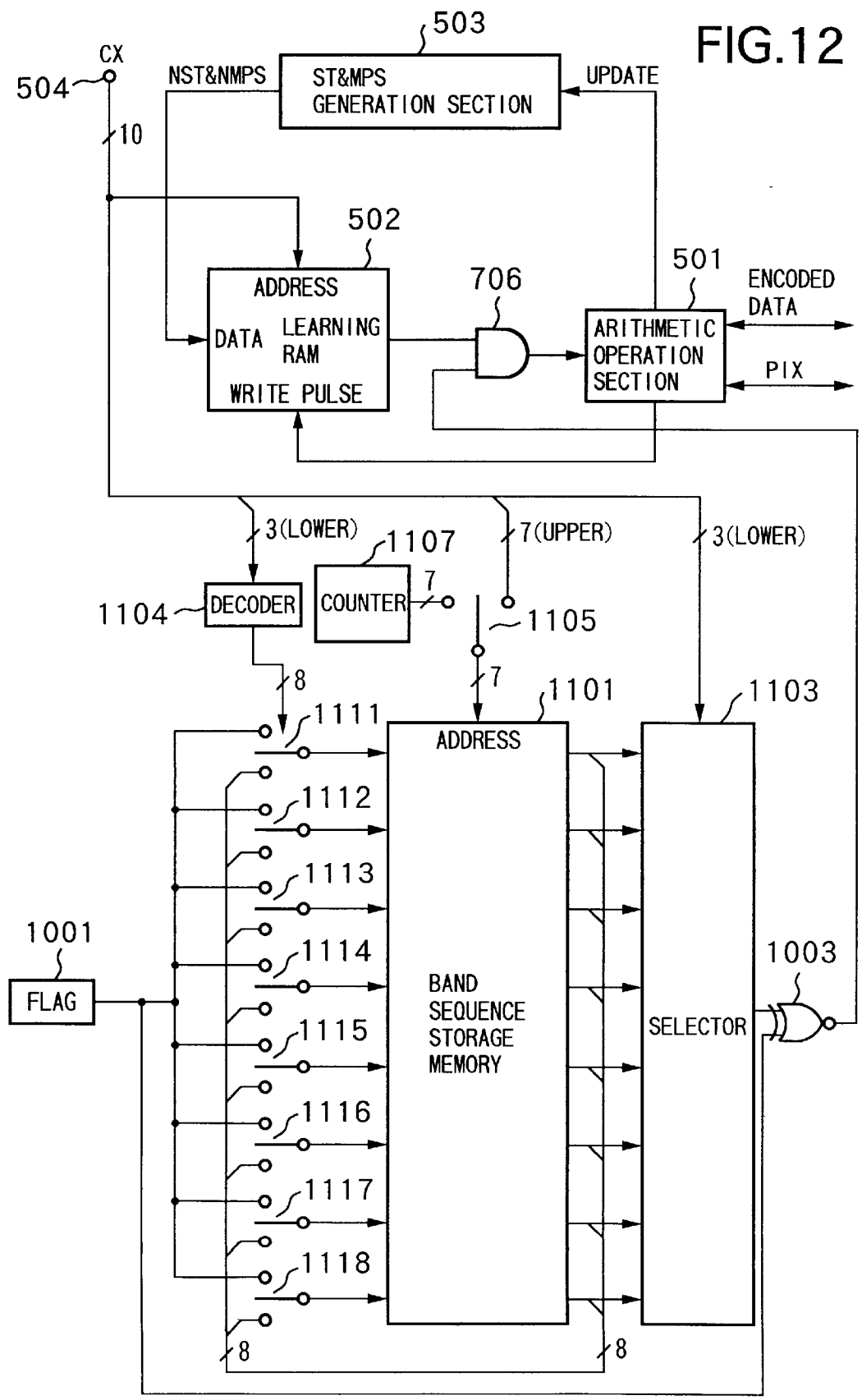
FIG. 12 is a block diagram showing the arrangement of an encoding/decoding apparatus according to the sixth embodiment of the present invention.
Figures 13, 14:
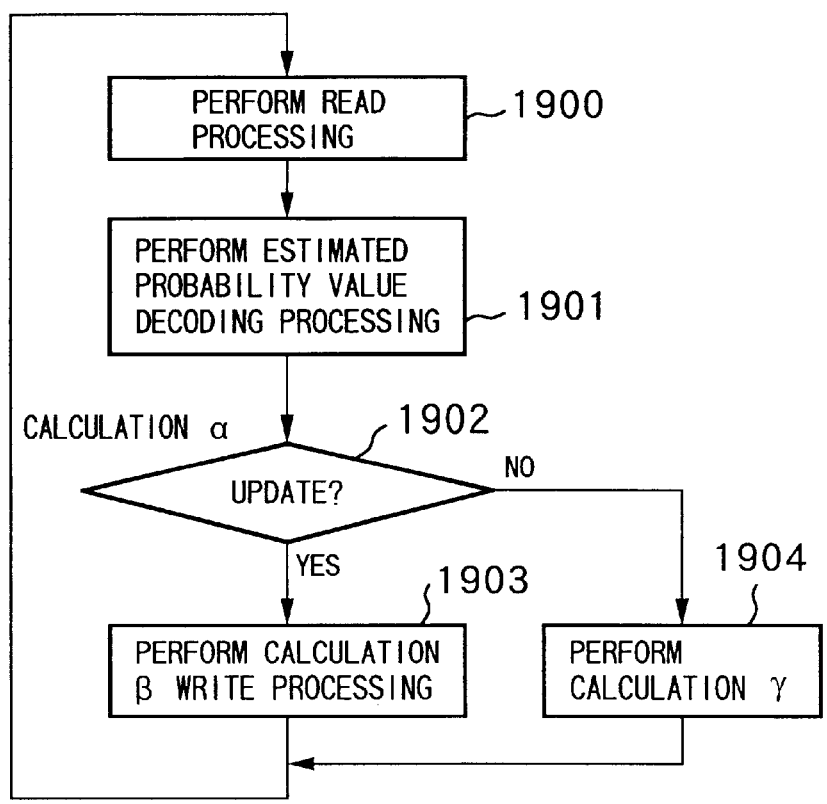
FIG. 13 is a flow chart schematically showing the operation procedure of the prior art.
FIG. 14 is a view showing an example of a template.
Figure 15:
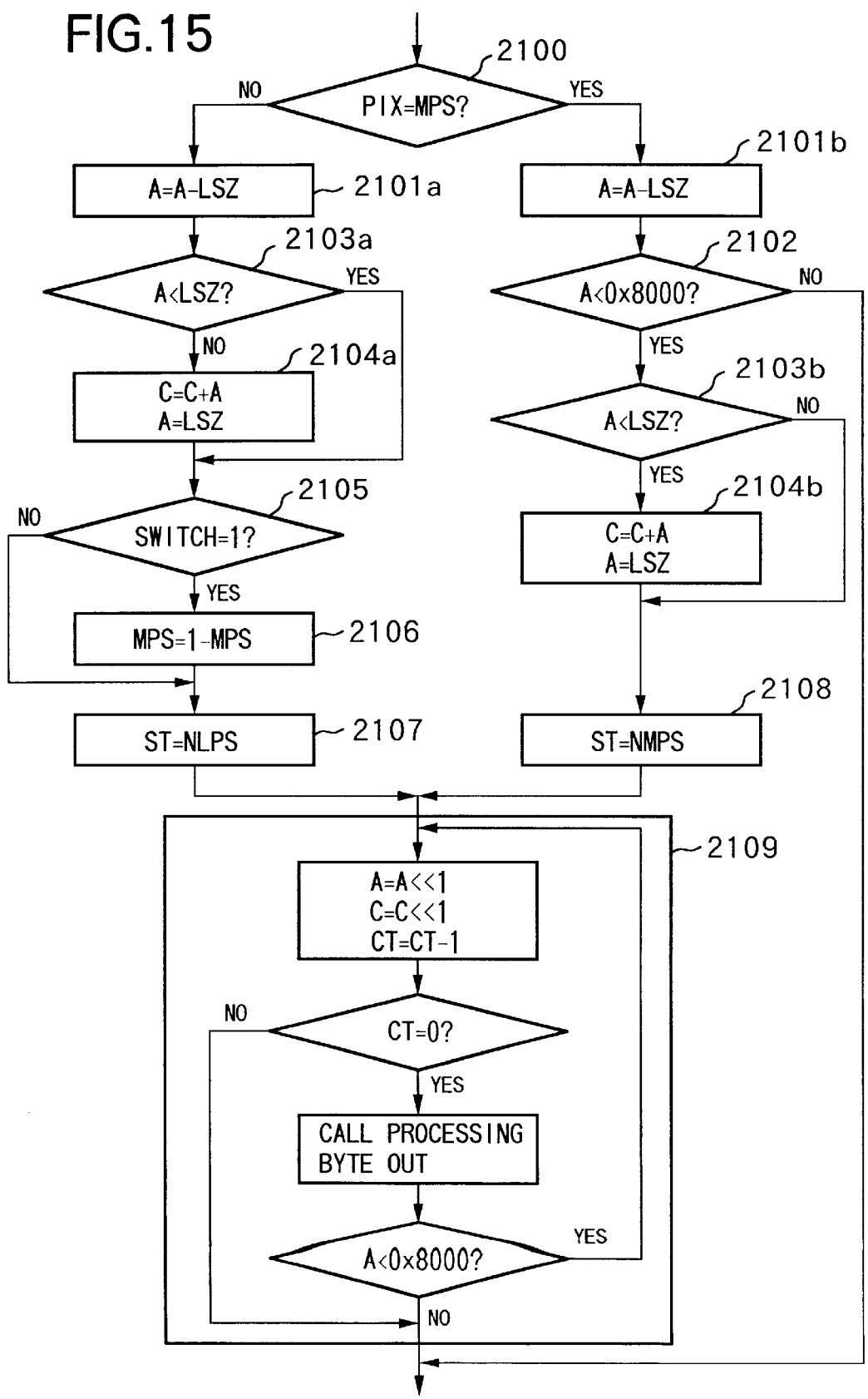
FIG. 15 is a general flow chart of processing "ENCODE" based on the JBIG encoding algorithm.

FIG. 12 is a block diagram of an encoding/decoding apparatus according to the sixth embodiment of the present invention. This embodiment is an application of the fifth embodiment.

In the above-described embodiments, the band sequence storage memory stores only one data at one address. In this embodiment, a plurality of data are stored at one address, and instead, the address space of the memory is reduced to increase the speed for access to all address spaces of the memory.

In the example shown in FIG. 12, a band sequence storage memory 1101 is constituted by 128 addresses×8 bits (in the fifth embodiment, the memory has 1,024 addresses×1 bit). The address signal input to the band sequence storage memory 1101 changes from a 10-bit signal to a 7-bit signal, and a signal of the three remaining bits is input to a selector 1103 for selecting 1 bit of 8-bit data read out from the band sequence storage memory 1101, and a decoder 1104. The decoder 1104 generates a signal for switching, to the output terminal of a flag 1001, only a corresponding one of selectors 1111 to 1118 provided for the respective bits of the 8-bit data input to the band sequence storage memory 1101, and selecting, for the remaining selectors, the output from the band sequence storage memory 1101. Selection of the output from the band sequence storage memory 1101 means holding the preceding data.

To cope with the 7-bit address, a selector 1105 for switching only the 7-bit address signal and a counter 1107 for generating the 7-bit address signal (in the memory clear mode) are added, and unnecessary elements are removed.

This embodiment has its characteristic feature not only in the arrangement of the band sequence storage memory 1101 but also in the manner of handling the learning RAM 502. More specifically, in the memory clear operation of this embodiment, the data write in the learning RAM 502 is not performed at all. The memory can be cleared to zero in the first initialization mode, as a matter of course, though even it is not necessary.

The operation principle will be described below.

As the clear operation of this embodiment, immediately before the value of the flag 1001 is inverted at the time of switching the band, the value of the flag 1001 is stored at all addresses of the band sequence storage memory 1101. With this arrangement, when the value of the flag 1001 changes, the contents at all addresses of the band sequence storage memory 1101 are different from the value of the flag 1001, so the learning RAM 502 is apparently completely cleared.

This processing is necessary every time the flag 1001 is inverted, i.e., every time the band is switched. However, the processing time can be shortened to ⅛ the conventional processing time, and can be further shortened by increasing the number of bits of the band sequence storage memory 1101 to decrease the addresses. Although this embodiment cannot always be applied to any cases, it is very effective when storage processing can be performed in units of bands.

The present invention is not limited to JBIG encoding/decoding processing and can be effectively used as a means, generally having a learning function, for regularly refreshing or clearing the learned contents.

The present invention may be applied to a system constituted by a plurality of devices (e.g., a host computer, an interface device, a reader, a printer, and the like) or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An encoding/decoding apparatus for encoding/decoding N units of image each having a predetermined size independently and sequentially, comprising:
   a first learning memory for storing a first group of reference data to be used for encoding/decoding an n-th ($1 \leq n \leq N$) unit of image, and for updating the first group of reference data in response to a result of encoding/decoding the n-th unit of image, said first learning memory being initialized before a use of encoding/decoding the n-th unit of image; and
   a second learning memory for storing a second group of reference data to be used for encoding/decoding an (n+1)-th unit of image, and for updating the second group of reference data in response to a result of encoding/decoding the (n+1)-th unit of image, said second learning memory being initialized before a use of encoding/decoding the (n+1)-th unit of image,
   wherein the first and second groups of reference data have same contents on being initialized.

2. An encoding/decoding apparatus according to claim 1, wherein said encoding/decoding apparatus performs a predictive encoding/decoding.

3. An encoding/decoding apparatus according to claim 1, wherein said encoding/decoding apparatus performs JBIG encoding/decoding.

4. An encoding/decoding apparatus according to claim 1, wherein said unit of image comprises a band of image included in a page of image.

5. An encoding/decoding apparatus according to claim 1, wherein said first and second learning memories have the same structure.

6. A method of encoding/decoding N units of image each having a predetermined size independently and sequentially, comprising the steps of:
   preparing a first learning memory for storing a first group of reference data to be used for encoding/decoding n-th ($1 \leq n \leq N$) unit of image, initializing said first learning memory before a use of encoding/decoding the n-th unit of image, and updating the first group of reference data in response to a result of encoding/decoding the n-th unit of image; and
   preparing a second learning memory for storing a second group of reference data to be used for encoding/decoding (n+1)-th unit of image, initializing said second learning memory before a use of encoding/decoding the (n+1)-th unit of image, and updating the second group of reference data in response to a result of encoding/decoding the (n+1)-th unit of image,
   wherein the first and second groups of reference data have same contents on being initialized.

7. An encoding/decoding apparatus for encoding/decoding a plurality of units of image independently and sequentially, comprising:
   a learning memory for storing a group of reference data to be referred for encoding/decoding each unit of image and updated in response to a result of encoding/decoding each unit of image; and
   an update timing storing memory for storing data indicating whether or not each reference data in said learning memory has been updated during a process of encoding/decoding a given unit of image,
   wherein, when data read out of said update timing storing memory indicates that reference data read out of said learning memory has not been so updated, said reference data read out of said learning memory is replaced with predetermined initial reference data.

8. An encoding/decoding apparatus according to claim 7, wherein said encoding/decoding apparatus performs JBIG encoding/decoding.

9. An encoding/decoding apparatus according to claim 7, wherein said unit of image comprises a band of image included in a page of image.

10. A method of encoding/decoding a plurality of units of image independently and sequentially, comprising the steps of:
   preparing a learning memory for storing a group of reference data to be referred for encoding/decoding each unit of image and updated in response to a result of encoding/decoding each unit of image;
   preparing an update timing storing memory for storing data indicating whether or not each reference data in the learning memory has been updated during a process of encoding/decoding a given unit of image; and
   when data read out of the update timing storing memory indicates that reference data read out of the learning memory has not been so updated, replacing the reference data read out of the learning memory with predetermined initial reference data.

* * * * *

UNITED STATES PATENT AND TRADEMARK OFFICE
CERTIFICATE OF CORRECTION

PATENT NO. : 6,473,530 B2  
DATED : October 29, 2002  
INVENTOR(S) : Tadayoshi Nakayama It is certified that error appears in the above-identified patent and that said Letters Patent is hereby corrected as shown below:

Column 3,  
Line 3, "an" should read -- a --.

Column 7,  
Line 64, "cleared This" should read -- cleared. This --; and  
Line 67, close up right margin.

Column 8,  
Line 1, close up left margin; and  
Line 34, "706" (second occurrence) should be deleted.

Column 9,  
Line 52, "infinitely becomes" should read -- become infinitely --.

Column 11,  
Line 22, "described" should read -- describe --.

Column 12,  
Line 47, "any" should read -- all --.

Column 14,  
Line 24, ".updated" should read -- updated --.

Signed and Sealed this

Fifteenth Day of July, 2003

JAMES E. ROGAN  
*Director of the United States Patent and Trademark Office*